United States Patent
Chen et al.

(10) Patent No.: US 6,382,945 B1
(45) Date of Patent: May 7, 2002

(54) RESIN PLUNGING APPARATUS FOR MOLDING RESIN TO SEAL AN ELECTRONIC DEVICE

(75) Inventors: Li-Wei Chen, Kaohsiung; Muh-Wang Liang, Miao Li Hsien; Sheng-Lang Lee, Hsinchu Hsien; Kuang-Yuan Hung, Hsinchu, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/321,543

(22) Filed: May 28, 1999

(30) Foreign Application Priority Data

Dec. 31, 1998 (CN) .......................... 87221918 U (51) Int. Cl.⁷ .......................... B29C 45/02; B29C 45/14
(52) U.S. Cl. .................... 425/116; 425/129.1; 425/544; 425/594; 425/DIG. 228
(58) Field of Search ............... 425/451.7, 544, 425/129.1, DIG. 228, 116, 589, 591, 594

(56) References Cited

U.S. PATENT DOCUMENTS

| | | | |
|---|---|---|---|
| 5,059,379 A | * 10/1991 | Tsutsumi et al. | 264/272.14 |
| 5,118,271 A | * 6/1992 | Baird et al. | 425/116 |
| 5,378,140 A | * 1/1995 | Asano et al. | 425/451.7 |
| 5,429,488 A | * 7/1995 | Neu | 425/129.1 |
| 5,435,953 A | 7/1995 | Osada et al. | 425/544 |
| 5,451,154 A | * 9/1995 | Schaars | 425/554 |
| 5,626,886 A | * 5/1997 | Ishii | 425/116 |
| 5,851,559 A | * 12/1998 | Scribner et al. | 425/544 |
| 5,989,471 A | * 11/1999 | Lian et al. | 425/451.7 |
| 6,030,569 A | * 2/2000 | Yu | 425/DIG. 129 |

* cited by examiner

Primary Examiner—Nam Nguyen
Assistant Examiner—Thu Khanh T. Nguyen
(74) Attorney, Agent, or Firm—Rabin & Berdo, P.C.

(57) ABSTRACT

A resin plunging apparatus for molding resin to seal an electronic device, in which a ball screw is rotated to move a movable base plate and two load elements at the movable base plate, enabling a plunger holder which is supported on the load elements to be moved with the movable base plate along guide bars, so that plungers which are securely mounted on the plunger holder are positively smoothly forced into cavities in upper and lower molds to plunge resin tablets.

11 Claims, 8 Drawing Sheets

RESIN PLUNGING APPARATUS FOR MOLDING RESIN TO SEAL AN ELECTRONIC DEVICE

BACKGROUND OF THE INVENTION

The present invention relates to a molding apparatus for molding resin to seal an electronic device, and more specifically to a resin plunging mechanism for the molding apparatus for plunging resin tablets into the molds in the molding apparatus.

Figure 1:
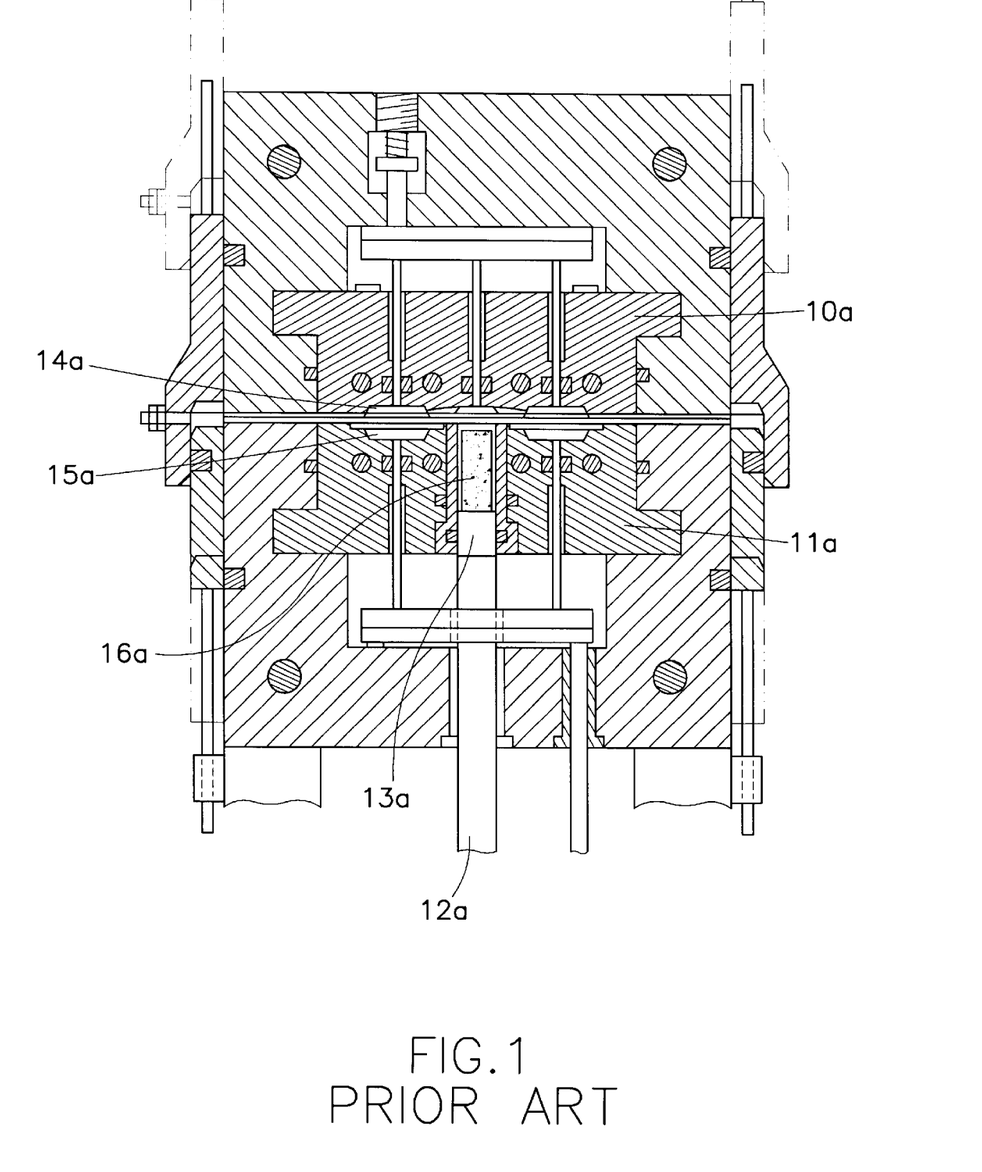
FIG. 1 is a sectional view of a molding apparatus according to the prior art.
Figure 2:
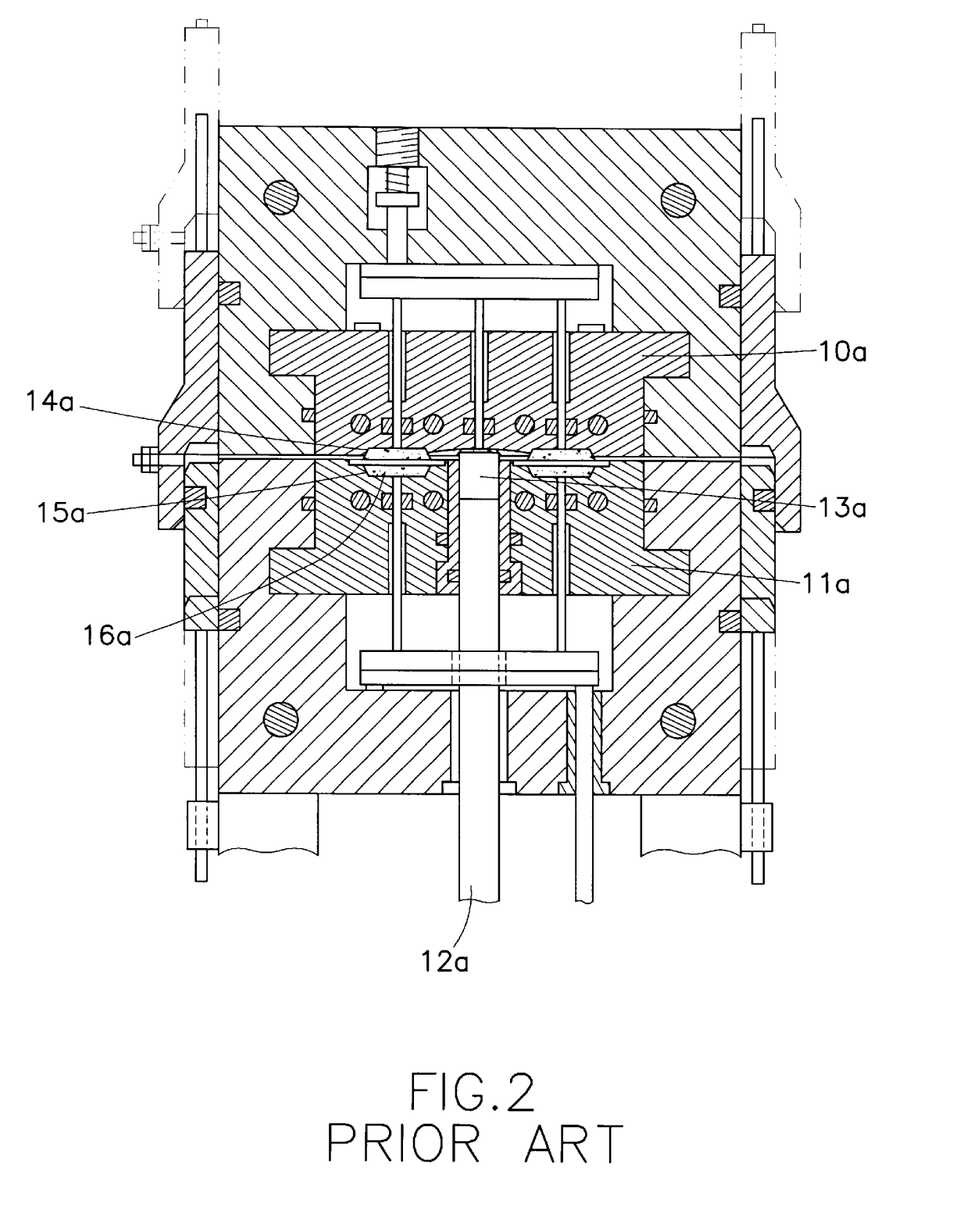
FIG. 2 is another sectional view of the prior art molding apparatus, showing resin tablets plunged into the cavities in the molds.
Figure 3:
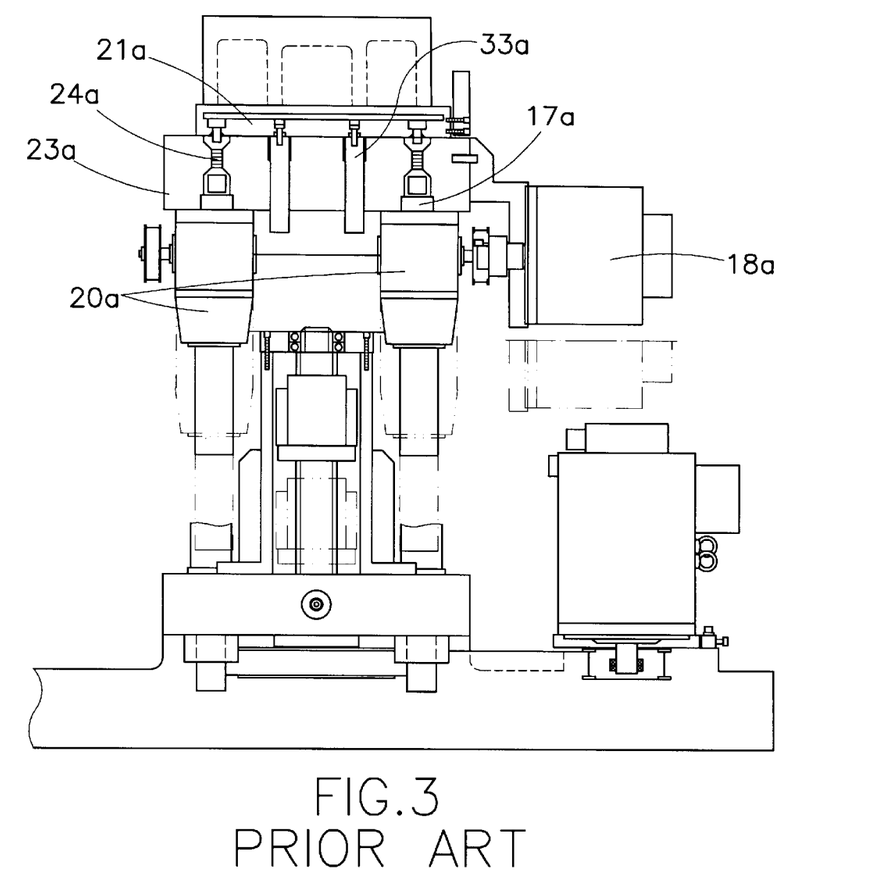
FIG. 3 is a front view of the prior art molding apparatus.
Figure 4:
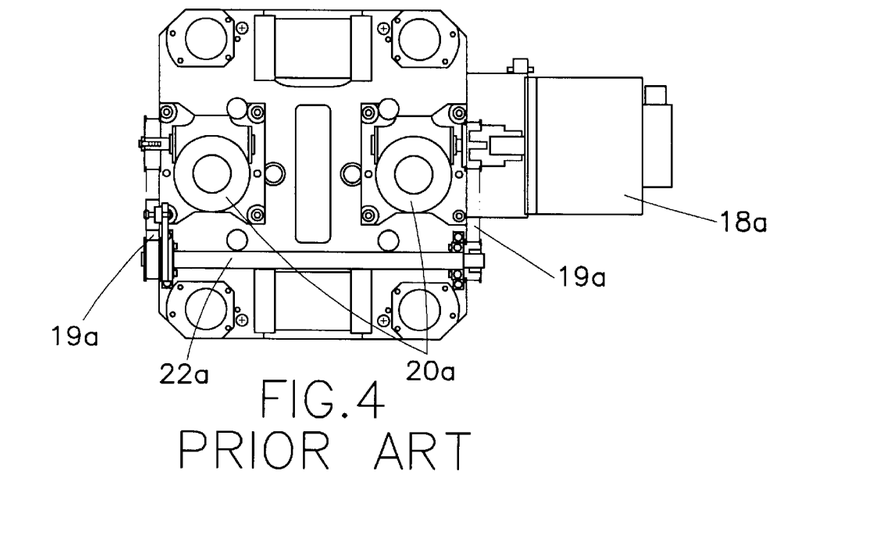
FIG. 4 is a bottom view of the prior art molding apparatus.
Figure 5:
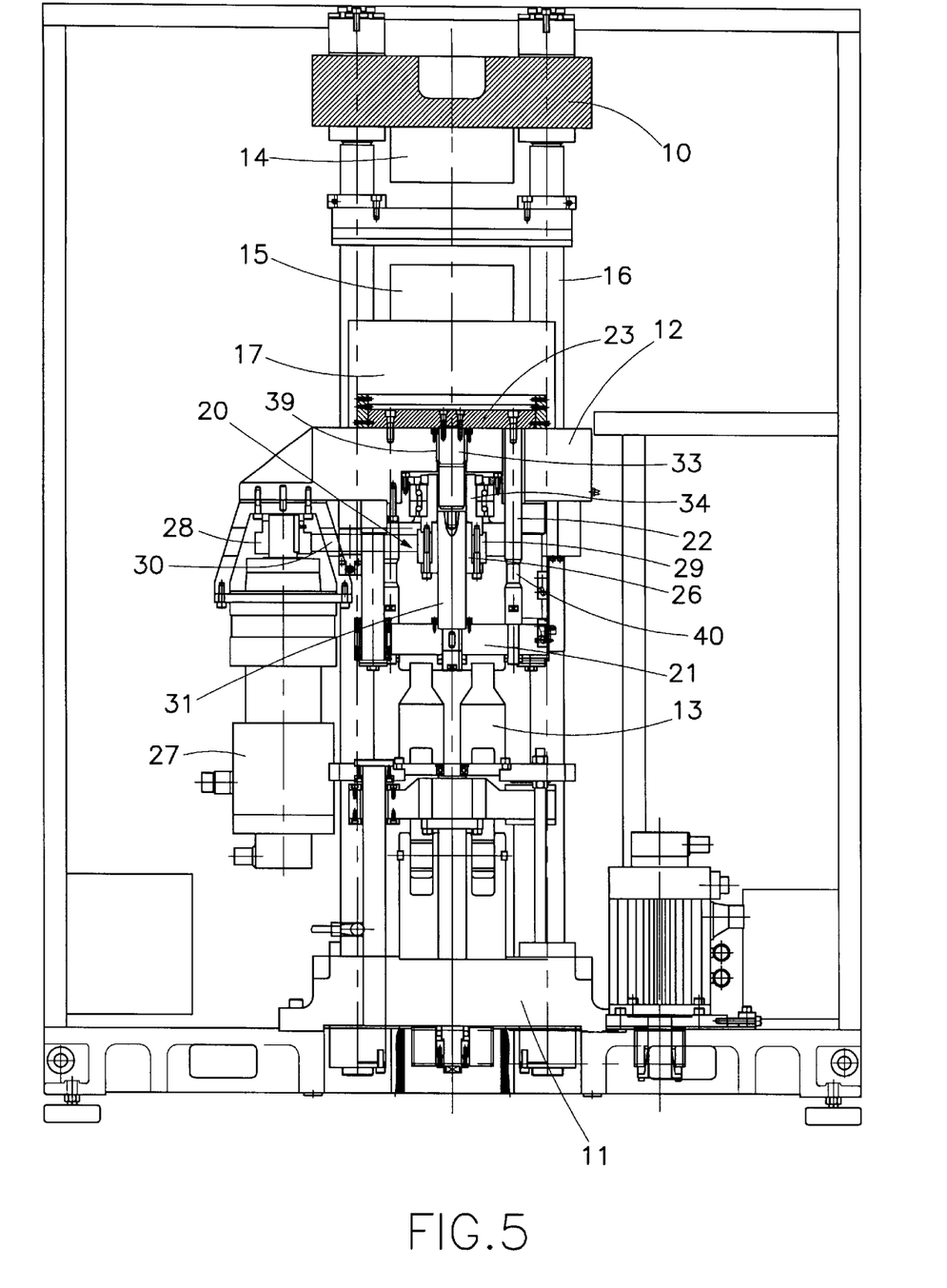
FIG. 5 is a front view of a molding apparatus according to the present invention.
Figure 6:
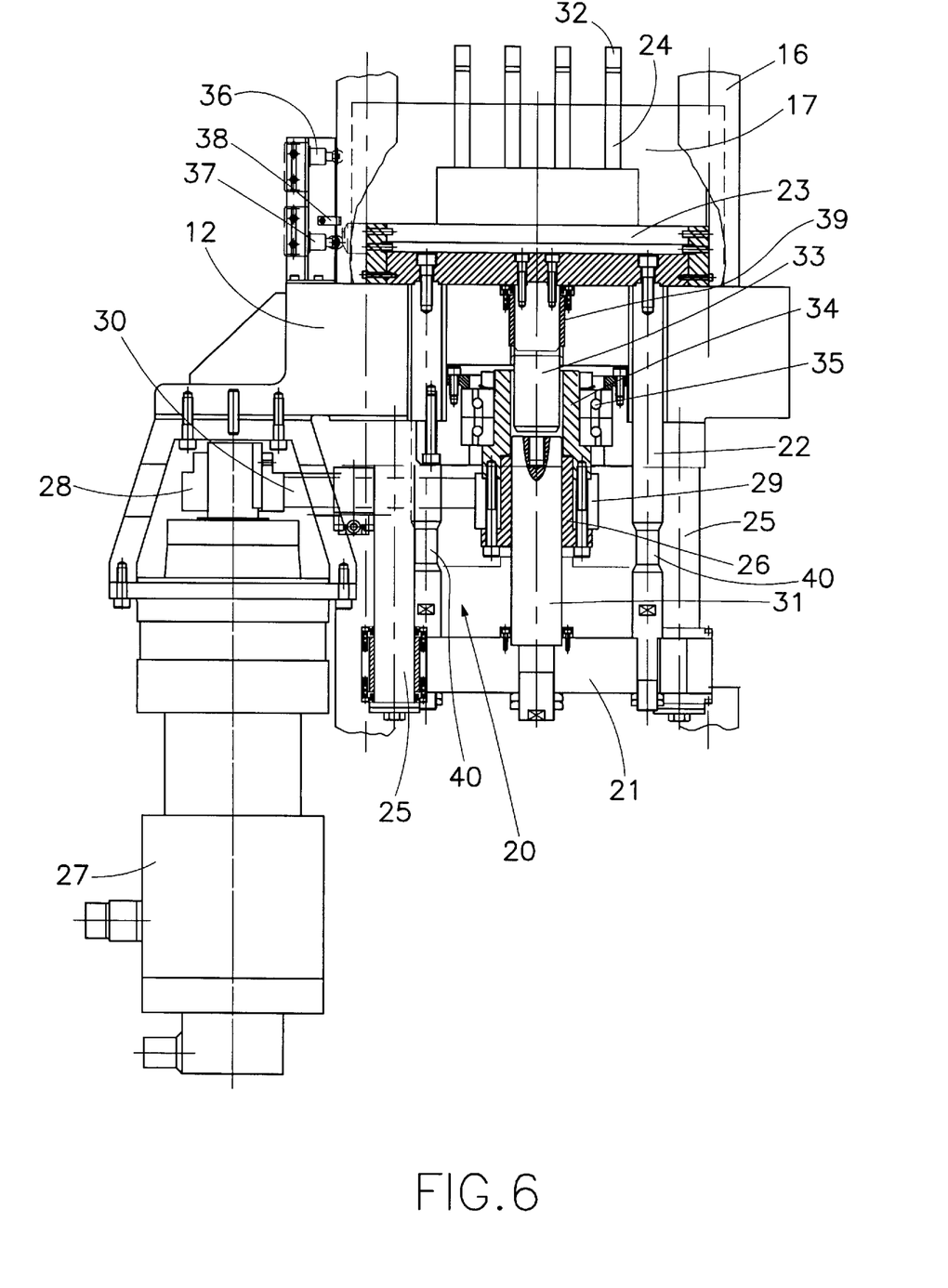
FIG. 6 is a front view of the plunging mechanism for the molding apparatus shown in FIG. 5.
Figure 7:
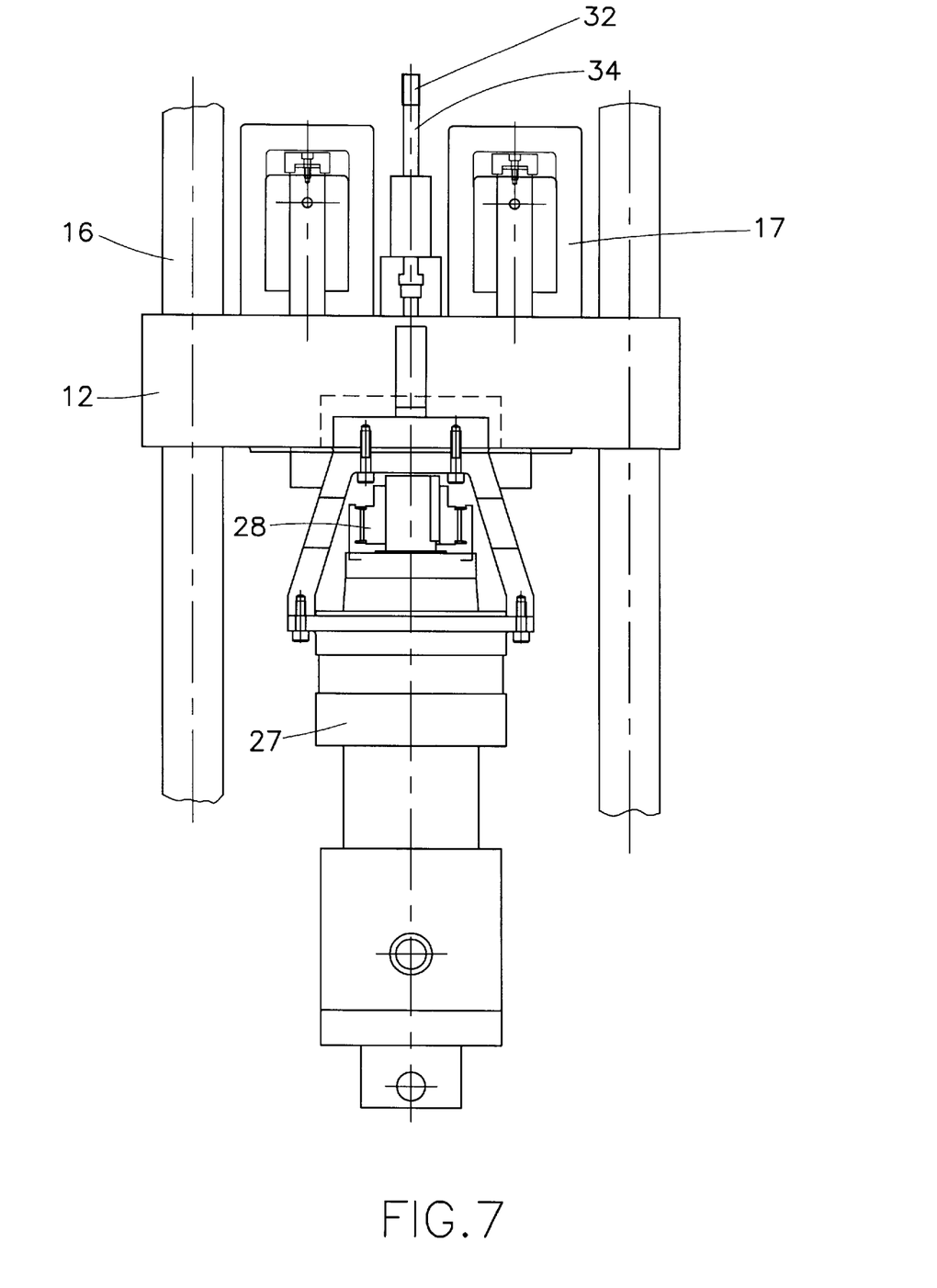
FIG. 7 is a side view of the plunging mechanism shown in FIG. 6.
Figure 8:
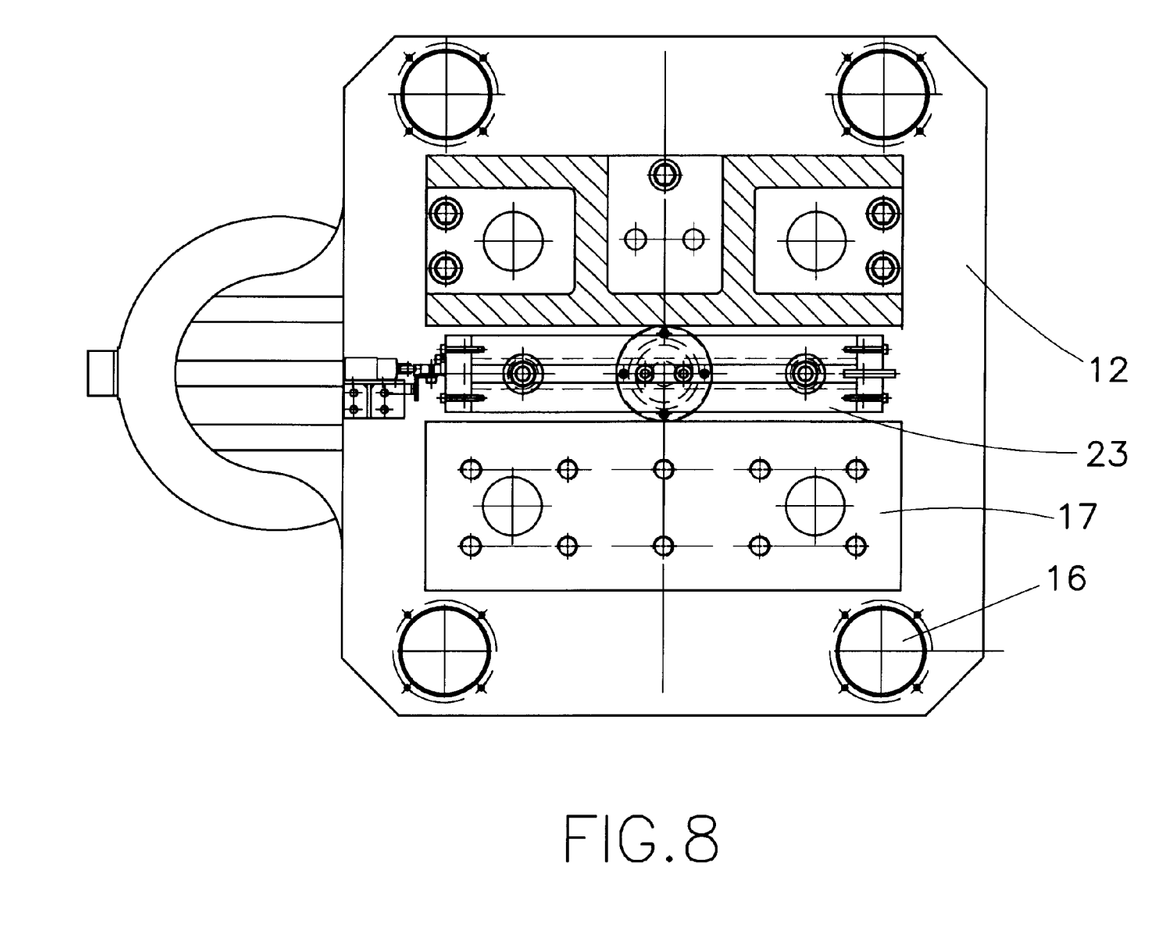
FIG. 8 is a top view of the plunging mechanism shown in FIG. 6.
Figure 9:
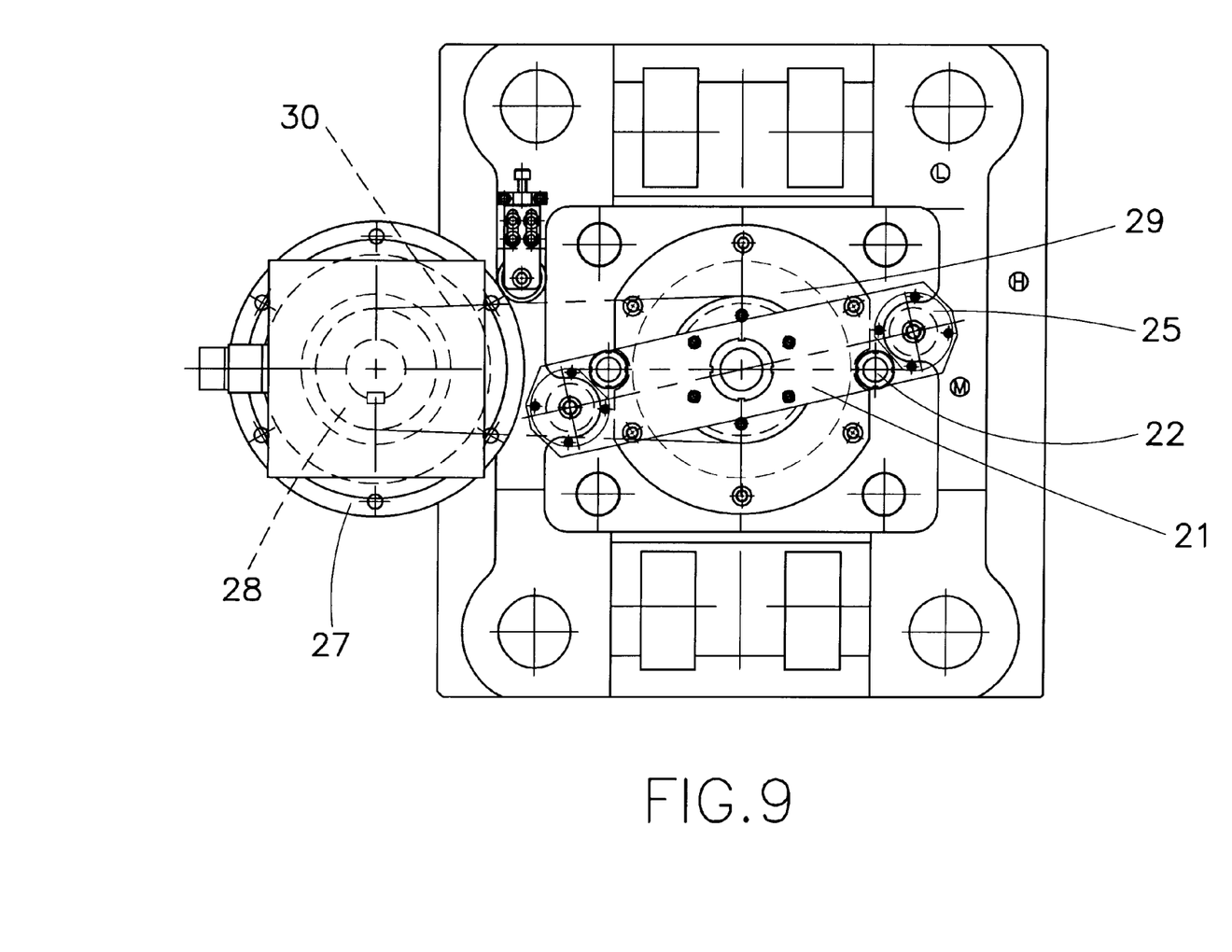
FIG. 9 is a bottom view of the plunging mechanism shown in FIG. 6.

FIGS. 1 and 2 show a molding apparatus for molding resin to seal an electronic device, for example, an IC according to U.S. Pat. No. 5,435,953. This structure of molding apparatus comprises a plurality of plungers 12a moved in and out of cavities 14a and 15a in stationary upper mold 10a and movable lower mold 11a. The plungers 12a each have a plunger head 13a. When the plungers 12a are moved into the cavities 14a and 15a in stationary upper mold 10a and movable lower mold 11a, resin tablets 16a are plunged into the molds 10a and 11a. The molding apparatus further comprises two load elements 17a driven by a motor 18a through a respective belt transmission mechanism 19a and a transmission rod 22a to move two worm gear and worm mechanisms 20a, causing the worm and worm gear mechanisms 20a to move plunger holder means 21a and the plungers 12a up and down. This plunging mechanism is complicated. Pitch error and deformation of the worm gear and worm mechanisms 20a and the belt transmission mechanism 19a affects the movement of the plunger holder means 21a, causing the plunger heads 13a unable to be synchronously moved into the cavities 14a and 15a in the molds 10a and 11a, therefore the plunger heads 13a tend to be damaged. Furthermore, during the operation of the molding apparatus, heat (molding temperature is as high as 170° C.) is transferred from the molds 10a and 11a through plunger holder means 21a to the load elements 17a and guide bars 33a causing the load elements 17a and guide bars 33a to deform (because the worm and worm gear mechanisms 20a and guide bars 33a are securely limited on the movable plate 23a, and no horizontal gap is left between the mechanisms 20a and guide bars 33a and the movable plate 23a to absorb the space expansion of the load elements 17a and the guide bar 33a). When the load elements 17a deform, the plungers 12a are forced to tilt in different directions, and the electronic device molding quality is affected. So the plunger heads 13a are damged easily.

SUMMARY OF THE INVENTION

The present invention provides a plunging mechanism for a molding apparatus which eliminates the aforesaid drawbacks. In the plunging mechanism according to the present invention, a ball screw is rotated to move a movable base plate and two load elements at the movable base plate, enabling a plunger holder which is supported on the load elements to be moved with the movable base plate along guide bars, so that plungers which are securely mounted on the plunger holder are positively forced into cavities in upper and lower molds to plunge resin tablets.

DETAILED DESCRIPTION OF THE PREFERRED EMBODIMENT

Referring to FIGS. 5, 6, 7, 8 and 9, an apparatus for molding a resin to seal an electronic device is shown comprised of a fixed top plate 10, a fixed bottom plate 11, a movable plate 12, a clamping mechanism 13 driven to clamp and open the movable plate 12 vertically along four guide bars 16 between the top plate 10 and the bottom plate 11, an upper mold 14 securely mounted on the bottom side wall of the top plate 10, load plate 17 securely mounted on the top side wall of movable plate 12, a lower mold 15 securely mounted on the top side wall of the load plate 17 and moved with the load plate 17 and the movable plate 12 relative to the upper mold 14. When the clamping mechanism 13 is operated, the movable plate 12 is moved upwards (or downwards), causing the lower mold 15 to be closed on (or opened from) the upper mold 14. The apparatus further comprises a resin plunging mechanism 20 controlled to plunge melted resin in the molds 14 and 15.

The aforesaid resin plunging mechanism 20 comprises a plurality of guide bars 25 connected in parallel to the bottom side wall of the movable plate 12, a movable base plate 21 moved up and down along the guide bars 25, two load elements 22 securely mounted on the movable base plate 21, a plunger holder 23, a plurality of plungers 24 securely mounted on the plunger holder 23, each plunger 24 having a front end terminating in a plunger head 32, a ball guide screw 31 connected to the center of the movable base plate 21, a nut 26 threaded onto the guide screw 31, a reversible motor 27 disposed below the movable plate 12, a driving pulley 28 securely mounted on the output shaft of the reversible motor 27, a follow up pulley 29 securely mounted on the nut 26, and a timing belt 30 mounted on the pulleys 28 and 29.

A movable guide bar 33 is securely mounted on the plunger holder 23 at the bottom side, and moved in an oilless bearing 39. The oilless bearing 39 is mounted in the movable plate 12. When the plunger holder 23 is moved up and down, it is guided by the guide bar 33. An upper limit switch 36, a lower limit switch 37 and a sensor 38 are disposed at one side relative to the plunger holder 23 to control moving distance of the plunger holder 23 and the plungers 24. Because the guide bar 33 is suspended at the center and the load elements 22 are inserted through respective through holes at the movable plate 12 with a gap left between the movable plate 12 and around the periphery of each load element 22, the resin plunging mechanism has better heat expansion absorbing capability when the temperature of the plunger holder 23 is increased due to heating of the molds 14 and 15, and strain gage 40 can be provided at the load elements 22 at a remote plate far away from the heat source.

When the reversible motor 27 is started to turn the pulleys 28 and 29 and the timing belt 30, the nut 26 is rotated with the pulley 29, thereby causing the ball screw 31 to be moved upwards or downwards. When the ball screw 31 is moved upwards, the resin tablets which are carried on the plunger heads 32 of the plungers 24 are plunged into cavities in the molds 14 and 15, enabling resin tablets to be melted and sealed to the electronic device. Further, the ball screw 31 can be replaced with a linear motor, hydraulic cylinder, or pneumatic cylinder, and the belt transmission mechanism can be replaced with a gear transmission mechanism or chain transmission mechanism.

As indicated above, the present invention uses a ball screw 31 and a movable base plate 21 to carry two load elements 22 up and down. Because the load elements 22 are securely connected to the movable base plate 21, the load elements 22 are synchronously moved with the movable base plate 21. Because the movable base plate 21 is moved along the guide bars 25, the movement of the movable base plate 21 is smooth and stable. Because the guide bar 33 is securely connected to the plunger holder 23 and moved with the plunger holder 23 in the oilless bearing 39, the plungers 24 are positively synchronously moved into the cavities in the molds 14 and 15, preventing the plunger heads 32 from damage.

It is to be understood that the drawings are designed for purposes of illustration only, and are not intended as a definition of the limits and scope of the invention disclosed.

What the invention claimed is:

1. A molding apparatus for molding resin to seal an electronic device, comprising:
    a first mold;
    a second mold movable relative to said first mold;
    a movable plate having said second mold disposed thereon;
    means for moving said movable plate to clamp said second mold against said first mold; and
    a resin plunging apparatus attached to said movable plate and being movable therewith, comprising:
        at least two guide bars secured to said movable plate so as to move therewith;
        a movable base plate reciprocated along said at least two guide bars and being movable relative to said movable plate;
        at least two load elements securely mounted on said movable base plate so as to be movable therewith;
        a plunger holder supported on said at least two load elements to hold a plurality of plungers and reciprocated with said movable base plate;
        drive means coupled to said movable base plate and driven to move said movable base plate and said at least two load elements up and down; and
        a further guide bar securely mounted on said plunger holder at a bottom side thereof so as to be movable therewith for guiding reciprocating movement of said plunger holder.

2. The resin plunging apparatus of claim 1, wherein said drive means comprises a ball screw coupled to said movable base plate.

3. The resin plunging apparatus of claim 1, wherein said drive means comprises a linear motor.

4. The resin plunging apparatus of claim 1, wherein said drive means comprises a hydraulic cylinder.

5. The resin plunging apparatus of claim 1, wherein said drive means comprises a pneumatic cylinder.

6. The resin plunging apparatus of claim 2, wherein said drive means further comprises a reversible motor having an output shaft, a nut threaded onto said ball screw and rotated to move said ball screw up and down, and a transmission mechanism coupled between the output shaft of said reversible motor and said nut.

7. The resin plunging apparatus of claim 6, wherein said transmission mechanism comprises a driving pulley securely mounted on the output shaft of said reversible motor, a follow up pulley securely mounted on said nut, and a timing belt mounted on said driving pulley and said follow up pulley.

8. The resin plunging apparatus of claim 6, wherein said transmission mechanism comprises a gear transmission mechanism coupled between the output shaft of said reversible motor and said nut.

9. The resin plunging apparatus of claim 6, wherein said transmission mechanism comprises a chain transmission mechanism coupled between the output shaft of said reversible motor and said nut.

10. The resin plunging apparatus of claim 1, further comprising an upper limit switch, a lower limit switch, and sensor means disposed at one side relative to said plunger holder for controlling the reciprocating distance of said plunger holder.

11. A molding apparatus, comprising:
    a first mold;
    a second mold movable relative to said first mold;
    a movable plate having said second mold disposed thereon;
    means for moving said movable plate to clamp said second mold against said first mold; and
    a resin plunging mechanism attached to said movable plate and being movable therewith, comprising:
        a movable base plate movable relative to said movable plate;
        at least two load elements, each having a first end fixed to said movable base plate so as to be movable therewith;
        a plunger holder disposed over said movable base plate and being fixed to a second end of each of the load elements so as to be movable therewith;
        a plurality of plungers attached to said plunger holder; and
        means for moving said movable base plate up and down relative to said movable plate, wherein when said movable base plate is moved in an upward direction, said movable base plate pushes said load elements, said plunger holder and said plungers in the upward direction, and wherein when said movable base plate is moved in a downward direction, said movable base plate pulls said load elements, said plunger holder and said plungers in the downward direction.

* * * * *